(12) United States Patent
Purcell et al.

(10) Patent No.: US 8,988,433 B2
(45) Date of Patent: Mar. 24, 2015

(54) SYSTEMS AND METHODS FOR PRIMITIVE INTERSECTION IN RAY TRACING

(75) Inventors: Stephen Purcell, Mountain View, CA (US); Christopher Philip Alan Tann, San Jose, CA (US); Jason Rupert Redgrave, Mountain View, CA (US); Cüneyt Özdaş, Berkeley, CA (US)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 946 days.

(21) Appl. No.: 13/096,585

(22) Filed: Apr. 28, 2011

(65) Prior Publication Data

US 2011/0267347 A1 Nov. 3, 2011

Related U.S. Application Data

(60) Provisional application No. 61/329,265, filed on Apr. 29, 2010.

(51) Int. Cl.
*G06T 15/06* (2011.01)

(52) U.S. Cl.
USPC .......................................... 345/426; 345/419

(58) Field of Classification Search
None
See application file for complete search history.

(56) References Cited

U.S. PATENT DOCUMENTS

| | | | | |
|---|---|---|---|---|
| 6,023,279 | A * | 2/2000 | Sowizral et al. | 345/421 |
| 6,344,837 | B1 * | 2/2002 | Gelsey | 345/6 |
| 6,559,843 | B1 * | 5/2003 | Hsu | 345/421 |
| 6,731,304 | B2 * | 5/2004 | Sowizral et al. | 345/622 |
| 7,012,604 | B1 * | 3/2006 | Christie et al. | 345/426 |
| 7,483,024 | B2 * | 1/2009 | Maillot | 345/420 |
| 2008/0043018 | A1 * | 2/2008 | Keller et al. | 345/426 |
| 2008/0158225 | A1 * | 7/2008 | Sathe et al. | 345/419 |
| 2008/0158251 | A1 * | 7/2008 | Sathe et al. | 345/620 |
| 2009/0102842 | A1 * | 4/2009 | Li | 345/422 |
| 2009/0167763 | A1 * | 7/2009 | Waechter et al. | 345/426 |

OTHER PUBLICATIONS

John Amanatides and Kin Choi, "Ray Tracing Triangular Meshes", In Western Computer Graphics Symposium, 1995, 10 pages, Apr. 1995.
Christian Lauterbach, Sung-Eui Yoon, Ming Tang and Dinesh Manocha, "ReduceM: Interactive and Memory Efficient Ray Tracing of Large Models," Computer Graphics Forum, vol. 27, Issue 4, pp. 1313-1321, Jun. 2008.

(Continued)

*Primary Examiner* — Said Broome
(74) *Attorney, Agent, or Firm* — Michael S. Garrabrants

(57) ABSTRACT

Aspects include systems, methods, and media for implementing methods relating to increasing consistency of results during intersection testing. In an example, vertexes define edges of primitives composing a scene (e.g., triangles defining a mesh for a surface of an object in a 3-D scene). An edge can be shared between two primitives. Intersection testing algorithms can use tests involving edges to determine whether or not the ray intersects a primitive defined by those edges. In one approach, a precedence among the vertexes defining a particular edge is enforced for such intersection testing. The precedence causes an intersection tester to always test a given edge in the same orientation, regardless of which primitive defined (at least in part) by that edge is being intersection tested.

10 Claims, 5 Drawing Sheets

(56) References Cited

OTHER PUBLICATIONS

Christian Lauterbach, Sung-Eui Yoon and Dinesh Manocha, "Ray-Strips: A Compact Mesh Representation for Interactive Ray Tracing," Proc. IEEE/EG Symp. on Interactive Ray Tracing, Sep. 10-12, 2007, Ulm, Germany, pp. 19-26.

Maxim Shevtsov, Alexei Soupikov, Alexander Kapustin and Nizhniy Novgorod, "Ray-Triangle Intersection Algorithm for Modern CPU Architectures," GraphiCon'2007, Jun. 23-27, 2007, Moscow, Russia, 7 pages.

Mark de Berg, Marc Van Kreveld, Mark Overmars, and Otfried Schwarzkopf, "Computational Geometry: Algorithms and Applications, Second Edition," 2000, Springer, Berlin, p. 7, Mar. 2000.

Donald E. Knuth, "The Art of Computer Programming, Third Edition," 1997, Addison-Wesley, Boston, MA, vol. 1, p. 20, Nov. 1997.

Amanatides "Ray Tracing Triangular Meshes" Western Computer Graphics Symposium 1995, Apr. 1995.

De Berg, "Computational Geometry—Algorithms and Applications" 2nd Ed. 2000 (Springer) p. 7, Mar. 2000

Knuth, "The Art of Computer Programming" 3rd Ed. 1997 Addison-Wesley vol. 1, p. 20, Jul. 1997.

Lauterbach "ReduceM: interactive and memory efficient ray tracing of large models" CG Forum Jun. 2008 vol. 27, No 4.

Lauterback "Ray-Strips: A Compact Mesh Representation for Interactive Ray Tracing" IEEE Symposium Interative Ray Tracing 2007, Jul. 2007.

PCT Search Report in PCT/US2011/034298.

Shevtsov "Ray-Triangle Intersection Algorithm for Modern CPU Architectures" Russia GraphiCon 2007 Moscow, Jun. 2007.

P.H. Christensen, J. Fong, D. M. Laur and Dana Batali, "Ray Tracing for the Movie 'Cars'," IEEE Symposium on Interactive Ray Tracing, 2006, pp. 1-6, Sep. 2006.

\* cited by examiner

SYSTEMS AND METHODS FOR PRIMITIVE INTERSECTION IN RAY TRACING

CROSS REFERENCE TO RELATED APPLICATIONS

This application claims priority from U.S. provisional patent application No. 61/329,265, entitled "SYSTEMS AND METHODS FOR PRIMITIVE INTERSECTION IN RAY TRACING", filed on Apr. 29, 2010, and which is incorporated by reference herein in its entirety for all purposes.

BACKGROUND

1. Field

The following relates generally to ray tracing systems that can be used, for example, in rendering 2-D representations of 3-D scenes, and more specifically to improvements in approaches for testing rays for intersection with surfaces ("intersection testing").

2. Related Art

Rendering photo-realistic 2-D images from 3-D scene descriptions with ray tracing is well-known in the computer graphics arts. Ray tracing usually involves obtaining a scene description composed of geometric shapes, which describe surfaces of structures in the scene, and can be called primitives. A common primitive shape is a triangle.

Virtual rays of light are traced into the scene from a view point ("a camera"); each ray is issued to travel through a respective pixel of the 2-D representation, on which that ray can have an effect. The rays are tested for intersection with scene primitives to identify a closest intersected primitive for each ray, if any.

After identifying an intersection for a given ray, a shader associated with that primitive determines what happens next. For example, if the primitive is part of a mirror, then a reflection ray is issued to determine whether light is hitting the intersected point from a luminaire, or in more complicated situations, subsurface reflection, and scattering can be modeled, which may cause issuance of different rays to be intersection tested. By further example, if a surface of an object were rough, not smooth, then a shader for that object may issue rays to model a diffuse reflection on that surface. As such, finding an intersection between a ray and a primitive is a step in determining whether and what kind of light energy may reach a pixel by virtue of a given ray.

When a primitive has been found to be intersected by a ray, and the shader for that intersection is to be executed, an intersection point of the ray is defined based on where the intersection on the primitive was found. This intersection point can serve as the origin for child rays that a shader may cast when shading this intersection. Improvements in algorithms to detect valid intersections between rays and surfaces remain desirable.

DETAILED DESCRIPTION

Figure 1:
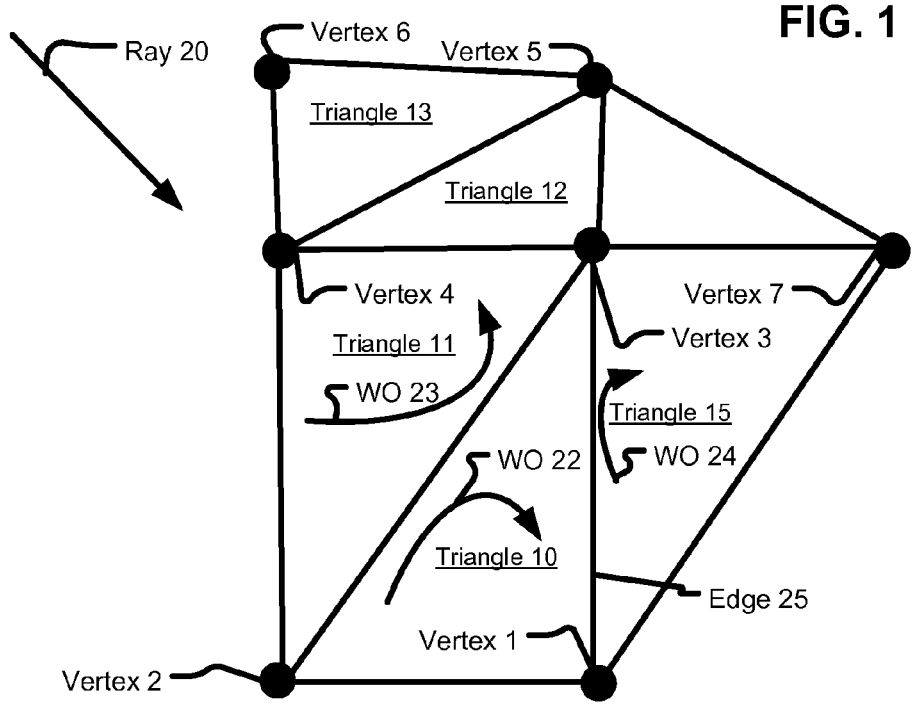
FIG. 1 depicts an example of a vertex-based representation of multiple triangular primitives, which may be used in defining an object or surface in a scene to be rendered.

The following primarily relates to using ray tracing as a mechanism to render 2-D representations of 3-D scenes. The 3-D scenes to be rendered often are created (specified) by artists who are designing content, such as a video game, a motion picture, an animated advertisement, industrial models, architectural features, such as buildings, and so on. An artist can be a person, or a person using authoring tools, or even can itself be primarily driven by software. To produce content descriptive of a 3-D scene, an artist contends with a number of challenges. For one thing, an artist describes the physical boundaries (surfaces) of the scene and the objects in it. The description of such physical boundaries can be detailed. For example, a useful model of a car being designed using Computer Aided Design (CAD) requires precise specification of the components of the car as well as their spatial relation to each other.

The artist also describes how the surfaces of the scene objects should look and behave. For example, an accurate model of the car would represent window glass differently from a headlight glass, differently from a painted surface. For example, in a video game, the artist would model a skin surface differently from a hair surface, and so on.

Thus, one construct employed in the field of rendering is to provide a physical scene model, and associate surface information with different parts of the scene model. For example, a scene model can contain objects including a person, an automobile, and a building. The physical model of the scene would describe the surfaces of these objects, for example, as a wire frame model, which can include a large number of primitive shapes interconnected with each other to describe boundaries of the surfaces. This physical model generally lacks information about the visual appearance of the objects' surfaces. Then, information and programming is associated with particular surfaces, and/or portions of particular surfaces that describe their appearance. Such information can include textures for the surfaces, while programming associated with the surfaces often is intended to model what effect the surface has on light hitting the surface. For example, programming allows modeling of glass, a shiny surface, a bumpy surface and so on. Such programming and information thus is bound or otherwise associated with portions of the physical model descriptive of those surfaces. For example, programming can be associated with or bound to a particular primitive. Such programming and other description, or portions thereof, for a particular primitive or scene object can be referred to generally as a "shader" for that primitive or object.

The following description, for clarity, primarily uses examples where scene objects being rendered are represented by meshes of simple planar shapes, such as triangles. However, objects for which intersection testing can be performed can be described with other methodologies, such as parametric methodologies, such as Bézier patches.

Rays may be tested for intersection in a scene in which surfaces, such as surfaces of objects, are defined by such approaches (e.g., meshes of primitives).

An intersection between a ray and a primitive (e.g., a triangle) can be determined by using any of a variety of intersection tests, such as the barycentric coordinate test, or the Möller-Trumbore algorithm. Such tests usually are conducted in floating point. All floating point calculations have a finite precision, and can only represent certain numbers. Thus, regardless of the precision used in the floating point tests, inaccuracies in representing results are inevitable. Primitives and other objects that can be intersected in a scene also "exist" at locations in 3-space.

Therefore, both the rays, these scene surfaces, and intersection points among them exist at points in the scene that cannot be precisely represented by a number of a given precision. This is true whether single or double precision floating point is used (or even some more precise number interpretation), as computers are expected to have a capability to represent numbers only to a finite precision. This is true also for at least the practical reason that the more precise a number representation is to be, the more data is required to represent that number. When dealing with complex scenes, requiring an extra byte of information to represent each vertex in a scene can result in tens or hundreds of megabytes of extra storage required for such scene data In the case of ray intersection testing, one inaccuracy that results is that the hit point between a ray and a primitive can be inaccurate. When a ray is found to intersect a surface, an intersection point between that surface and the ray may be used as an origin to cast other rays. However, it is not always the case that every detected intersection between a ray and a surface is necessarily an intersection point of interest.

An intersection point can be represented in scene space by using a floating point tuplet of a certain precision, such as single precision or double precision. Barycentric coordinates and an intersection distance can be generated for an intersection point, as is known by those of ordinary skill in the art. Barycentric co-ordinates can be found from "volumes" that were calculated during the edge tests. These coordinates are known as u, v and w. The sum of the co-ordinates also can provide a value for the "d", which also can be calculated by taking the dot product of the ray direction and the triangle normal. The output Barycentric coordinates can be normalized such that un+vn+wn=1 (e.g., un=u/d, vn=v/d, wn=w/d). Only two Barycentric coordinates, u and v, need be outputted, in general, as the third co-ordinate is redundant.

Due to the nature of floating point number representation and floating point calculations, results of intersection testing rays with triangular primitives (and more generally, any kind of primitive where two or more adjacent primitives can share an edge) can be dependent on relative orientations of the rays and objects involved in a given test. One particular situation is where multiple primitives share an edge—such as where two triangles share an edge. Sometimes, a crack can be "found" at such an edge during intersection testing, where none exists in reality. Some aspects of the following disclosure relate to reducing artifacts of this sort during such ray intersection testing.

In sum, the intersection point (origin for child rays) in the abstract represents a point on a surface determined to have been intersected by a ray, and ideally would serve as the exact origin for new rays resulting from shading. However, that point can only be expressed to a finite precision, in that computers represent real numbers with finite precision. When implementing these models, inaccuracies and visual artifacts can be caused by such imprecision. Thus, the data describing the point, as it is stored, can have, and quite often does have, errors that place the intersection point off the surface of the scene (primitive) that was intersected.

FIG. 1 depicts a toy example of geometry that may be tested for intersection with a ray 20. The depicted geometry can be composed of edges determined between a number of vertices. The depicted vertices include vertices 1-7. Of course, a wide variety of edges can be drawn between the seven vertices depicted, and a convention can be imposed on which vertices will be connected by an edge. Such convention can be determined, for example, based in part on a list order of vertices (e.g., a list order can be an order in which a number of vertices are stored). Thus, as depicted, vertex 1 and vertex 2 are connected; in turn, vertex 2 and 3 are connected; and, to make a closed shape, vertex 3 can be connected to vertex 1 by an edge, to thereby define a triangle 10. To reduce storage space requirements, triangle strips can be used, which allows an additional vertex to be used with previous vertices to define an additional primitive (e.g., triangle). Here, a vertex 4 is added next, and triangle 11 results.

Winding order (WO) 22 and winding order (WO) 23 are depicted; typically, winding order changes with every additional primitive in a strip. Winding orders can be used in defining a normal for a primitive. Conventionally, a primitive is typically considered to have a normal which can be defined by a "right-hand rule", fingers following the winding order of the primitive being considered and thumb pointing in the normal direction.

FIG. 1 depicts that additional primitives (triangles 12 and 13 are added based on vertexes 5 and 6. FIG. 1 also depicts that additional primitives can be defined by other mechanisms, such as triangle stripping, or other approaches. In particular, vertex 7 is added, and in conjunction with vertexes 1 and 3, forms triangle 15, which is depicted as having a winding order 24. Thus, edge 25 is shared between triangle 10 and triangle 15. If edge 25 is used as defined by winding order 22 to test triangle 10, and as defined by winding order 24 to test triangle 15, then edge 25 will be tested in a different orientation between triangle 10 and triangle 15.

More generally, scene geometry to be tested for intersection can be defined in a wide variety of ways. In situations where an edge exists between two geometry elements, implementations of the described aspects herein cause the edge to be tested in the same orientation. An edge can be a straight line between two vertices, or an arbitrary curve that includes any number of control points. For clarity of explanation, edges are depicted and described as line segments defined by two vertices, respectively. However, such explanation is not by way of limitation.

Figure 2:
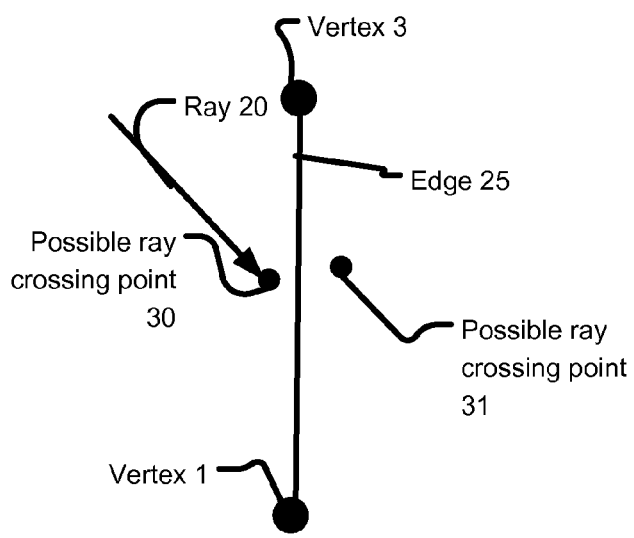
FIG. 2 depicts a situation where during intersection testing of a ray with a particular surface (e.g., a surface defined by a primitive), a relative position of a ray and an edge can be clamped on different sides of the surface, depending on relative orientations of the surface and the ray being intersection tested.

FIG. 2 depicts edge 25, with ray 20. In view of the finite precision inherent in floating point, two example possible crossing points 30 and 31 of ray 20 with the edge 25 (i.e., as ray 20 is passing near edge 25 in 3-D space, ray 20 may be determined to pass edge 25 on either side of edge 25, depending, at least in part, on floating point arithmetic. Particular intersection testing approaches may have different implementations of such an edge-based test. However, in a prototypical example, such a test determines on what side of edge 25 the ray is, within a plane defined by the vertices of the primitive being tested. Neither of such ray crossing points 30 and 31 may represent an "actual" point. However, by testing edge 25 in the same relative orientation or direction, each time it is used in a primitive test, any inaccuracy is made more consistent. Making potential inaccuracy more consistent makes anomalies less likely.

This disclosure discloses a variety of approaches that can be used to make such edges tested in a consistent orientation. One example is to establish a scene-wide convention to distinguish between two vertices, in order to identify a "start" and an "end" to a given edge (whether it be a line segment, or a complex curve). One example of a scene-wide convention is to make a convention that an edge will be given a direction based on relative positions of the two vertices that terminate the edge. An example of such relative positional usage is to (1) sort the terminating vertices based on which has a greater (lesser) value in an X coordinate; if equal in X, then (2) sort in Y; if equal in Y, then (3) sort in Z. An XYZ coordinate plan is exemplary, as is the ordering of coordinate planes tested. Rather, the implementation is to establish a convention that is observed for testing the scene (the convention could be changed through the scene, so long as the same edge is tested under the same convention, but for clarity, it is assumed that the convention, once established will be observed.)

Figure 3:
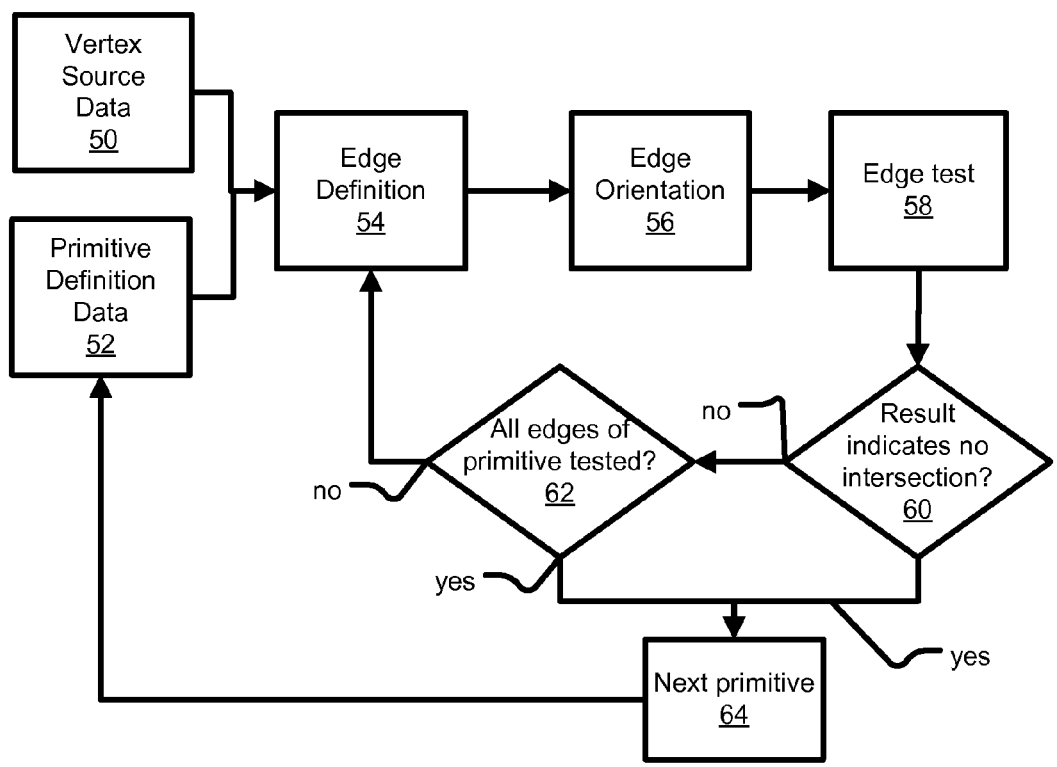
FIG. 3 depicts a process by which geometric primitives can be tested for intersection with a ray or rays based on an intersection testing process that uses edges of such primitives.

A context in which such approaches can be practiced is described with respect to FIG. 3. FIG. 3 depicts a source of vertex data 50, and a source of primitive definition data 52. From this data sources, a definition of an edge to be used as input to intersection testing is defined 54 (e.g., as described with respect to FIG. 1.) Before such edge is tested, the edge is oriented (56) based on a precedence established between the vertexes defining the ends of the edge to be tested. Thereafter, the edge is tested (58). In some situations, the results of this edge test may indicate a failure to intersect the primitive being tested (e.g., testing edge 25 of primitive 15). If so, then a next primitive can be tested (64), for which primitive definition data can be obtained from source 52. However, if the lack of intersection cannot be determined, a positive intersection may not yet be determinable (e.g., because more edges remain to be tested), and so, a test can be done to determine if more edges are to be tested (62). If not, then a next primitive is tested (64). If more edges remain, then the next edge can be caused to be defined (54). A different implementation may test the edges in parallel. A still different implementation may test multiple rays with the same edge.

Figure 4:
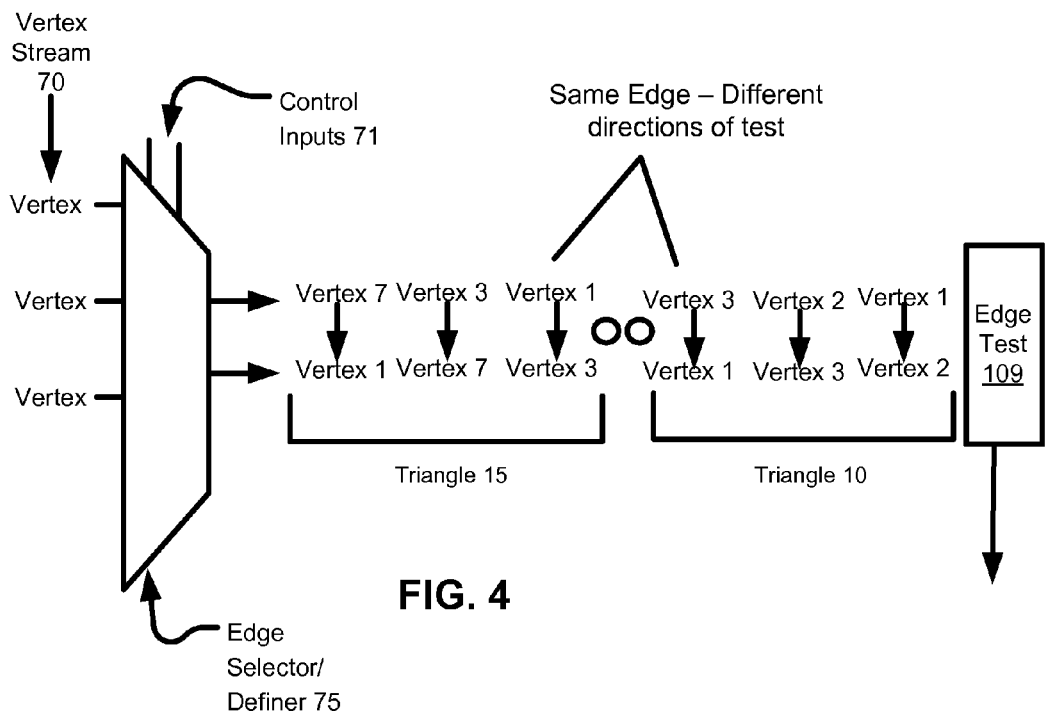
FIGS. 4 and 5 depict a situation where the same edge is shared by multiple primitives, and the reordering of vertexes defining such an edge so that the edge is tested in a consistent orientation or according to a scene-wide convention.
Figure 5:
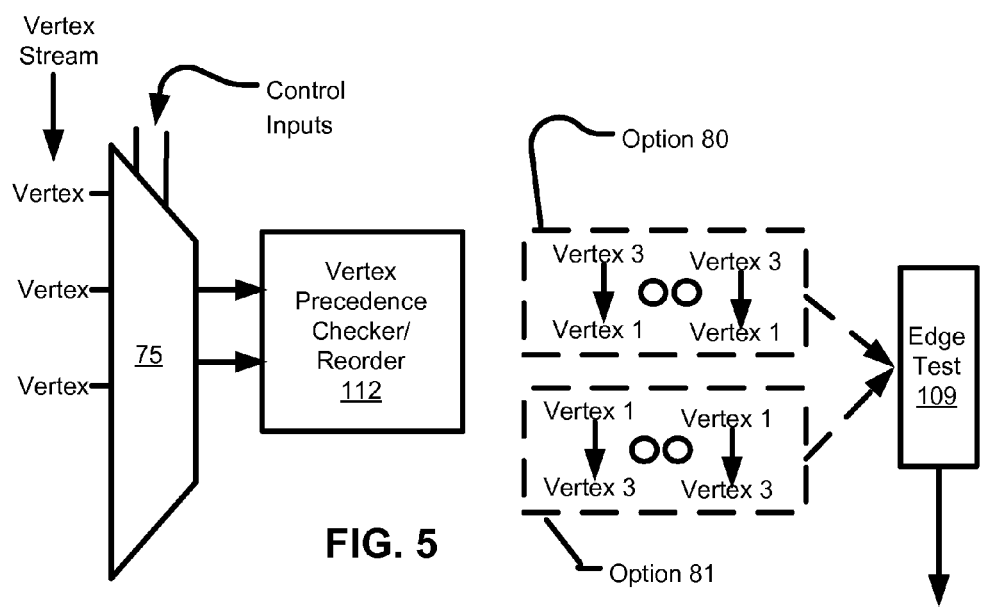

FIGS. 4 and 5 depict a more granular view of how edges can be oriented, where the approach depicted in FIG. 5 is contrastable with that of FIG. 4. FIG. 4 depicts that a vertex stream 70 provides input to an edge selector/definer 75, which receives control inputs 71. The output of the edge selector 75 is a stream of vertex pairs, which each define an edge to be tested by edge tester 109. The vertices defining the edges of triangle 10 and those of triangle 15 are identified. It is noted that edge 25 (defined by vertexes 1 and 3) is tested twice, with different orientations of the vertexes. The approach of FIG. 5 is to provide a vertex precedence checker/reorder function 112 ("reorder function 112") at an output of edge selector/definer 75. Thus, the output of checker/reorder function 112 shows that either vertex 3 and vertex 1 are switched so that each time edge 25 is tested, it is tested in the same orientation.

The depiction of a multiplexer as edge selector 75 is by way of explanation, and a variety of approaches to reordering of vertices to maintain consistent edge orientation can be provided. Also, multiplexing functionality can be implemented in fixed function hardware or software running on hardware. Control information for such multiplexing can come, for example, from min/max sorting in one or more dimensions, from a bit associated with a vertex of a group of vertices, or by establishing a precedence for a group of vertices by selecting a precedence or ordering, and then enforcing it when intersection testing primitives defined by that group of vertices.

Intersection testing can be implemented in architectures where multiple rays are concurrently tested against a triangle or where multiple triangles are concurrently tested against a ray. Here, concurrency includes that some values that may be calculated for one primitive intersection test may be reused for another primitive intersection test. Such testing approaches can have efficiency advantages because parts of the calculations can be done a single time and shared. A variety of permutations of how triangle tests can be multiplexed exist, and the above-described aspects can be applied by those of ordinary skill to these permutations, based on the disclosure herein.

Figure 6:
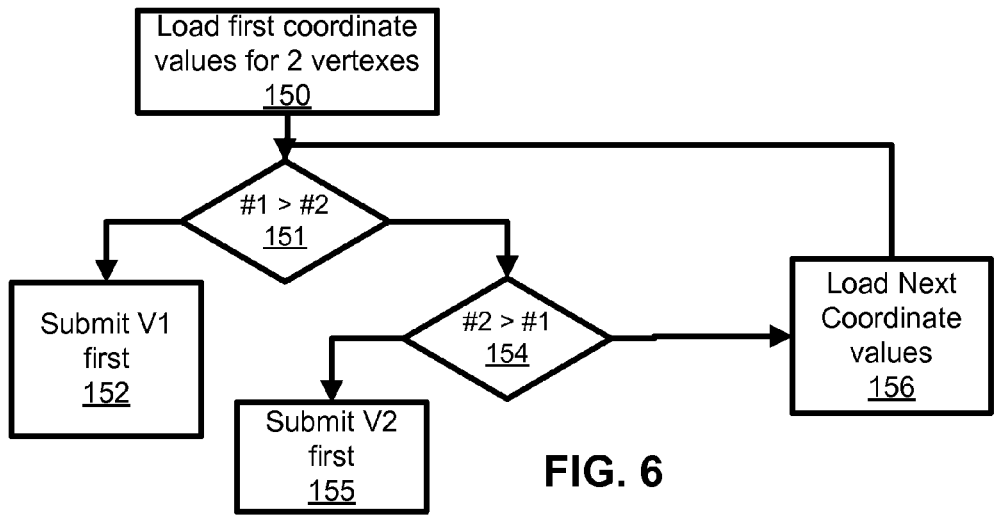
FIG. 6 depicts an approach to determining the consistent orientation by using relative positions of the vertexes of a vertex pair.

FIG. 6 depicts an example implementation of reorder function 112. In FIG. 6, reorder function 112 loads (150) first coordinate values for two vertexes that represent an edge. In the remainder of this example, for clarity, an example using a Cartesian coordinate system is used, although no limitation on coordinate systems is to be implied by such example. With the Cartesian example, X coordinate values are loaded (more generally, values for any coordinate can be tested in any order). If the X coordinate for the first vertex is greater than the second (151), then the first vertex is submitted (152) first (e.g., is considered a start of the edge), and if the X coordinate for the second vertex is greater (154), then the second vertex is submitted (155) as the start of the edge. Thus, the vertexes can be swapped in order, if necessary. Otherwise (if the X values are the same), values for the next axis are loaded (156) (e.g., for the Y axis), and the comparisons 151 and 154 are repeated. Similarly, if at comparison (154), the second vertex is not submitted (155), then the Z axis values are loaded. Of course, FIG. 6 depicts one implementation. Another implementation may test all axis values at the same time, and using voting; another implementation may make a hash value based on the values for the vertexes, by way of example. Those of ordinary skill would be able to devise still further implementations based on these examples.

Figure 7:
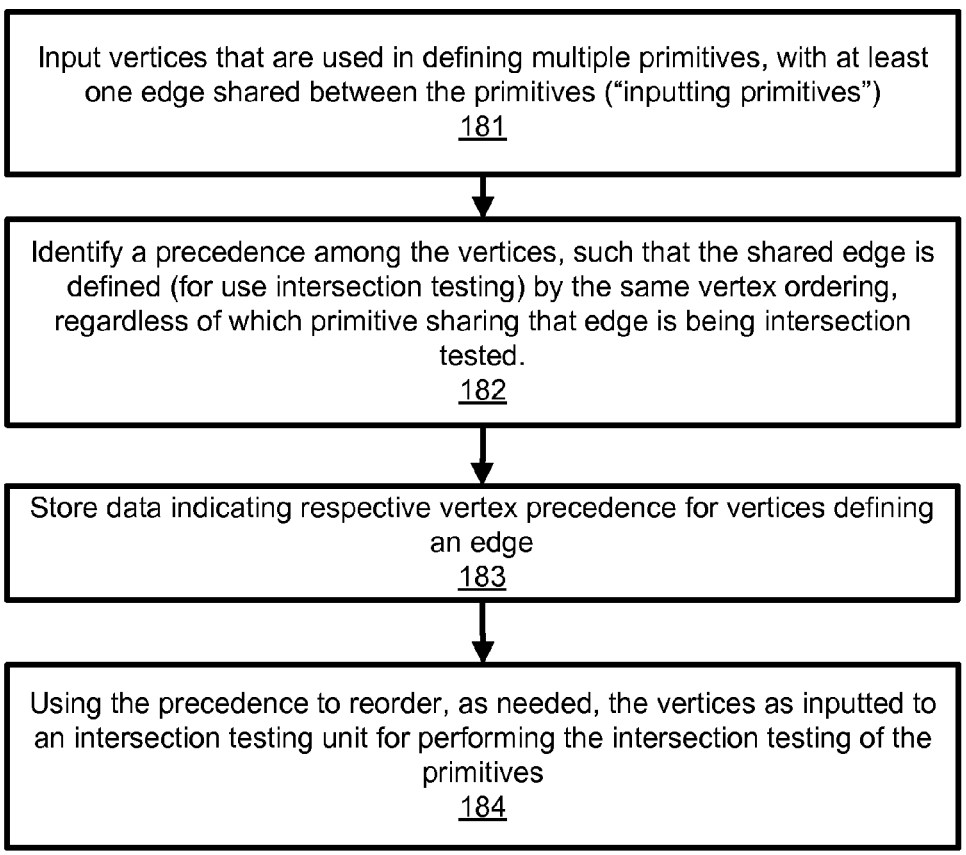
FIG. 7 depicts an overall process for determining a relative precedent or orientation of vertexes defining an edge.

More generally, FIG. 7 depicts a method in which vertices that are components of definitions for at least two primitives are inputted (181) (e.g., these primitives share an edge). Such inputting can occur, as explained below, by an API, and a number of primitives can be processed in a batch by such API functionality. A vertex (or vertices) that has precedence (have precedence, respectively, for multiple vertex pairs) is identified (182). If such identification is performed in a batch (preprocessing), rather than during runtime intersection testing, then information, such as a precedence bit can be associated with a vertex of a vertex pair that defines an edge. Such a precedence bit can be stored, in some implementations only for those edges for which a natural or normal vertex precedence is to be reversed. When using the edges for intersection testing, the vertices are reordered (184) as necessary, based on the scene-wide convention, or based on the precedence information.

Figure 8:
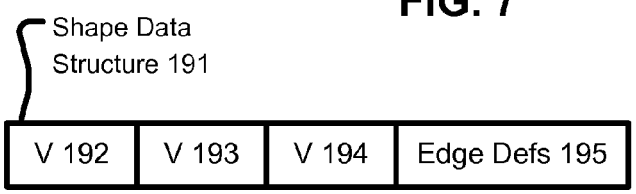
FIG. 8 depicts a data structure that can be generated and which includes information that can be used to consistently orient an edge for use during intersection testing.

FIG. 8 depicts an example of a data structure 191 that can be used to define a shape. Data structure 191 can include vertex definition data 192-194, and edge definition data 195. Data structure 191 can be designed according to how data will be consumed by an intersection tester. For example, an intersection tester can by default operate to interpret data structure 191 so that an edge exists between each defined vertex. By further example, the intersection tester can be default test the edges in an order based on the ordering of the vertexes in the data structure. In such an example, edge definition data 195 can include a bit field for each edge, indicating whether that edge should be tested in a direction opposite the default. Of course, a variety of data structures and other mechanisms for defining primitives, or determining edges from a set of vertexes can be provided, and can vary based on implementation.

As explained, the precedence determination is used primarily for defining an order of the vertexes during intersection testing, even while the ordering of how the vertexes are submitted, such as from a geometry unit, or as stored in memory can be unchanged or unaffected. In other examples, such precedence information can be stored or used to reorder the vertexes after submission and as stored. Such examples may require more memory usage in that a normal direction (winding order) for the primitives also may need to be defined by data stored in memory. Examples can include assuming a default winding order and precedence, and where they disagree for a particular, edge, indicating that disagreement with a bit or bits associated with that edge or the vertex pair.

Figure 9:
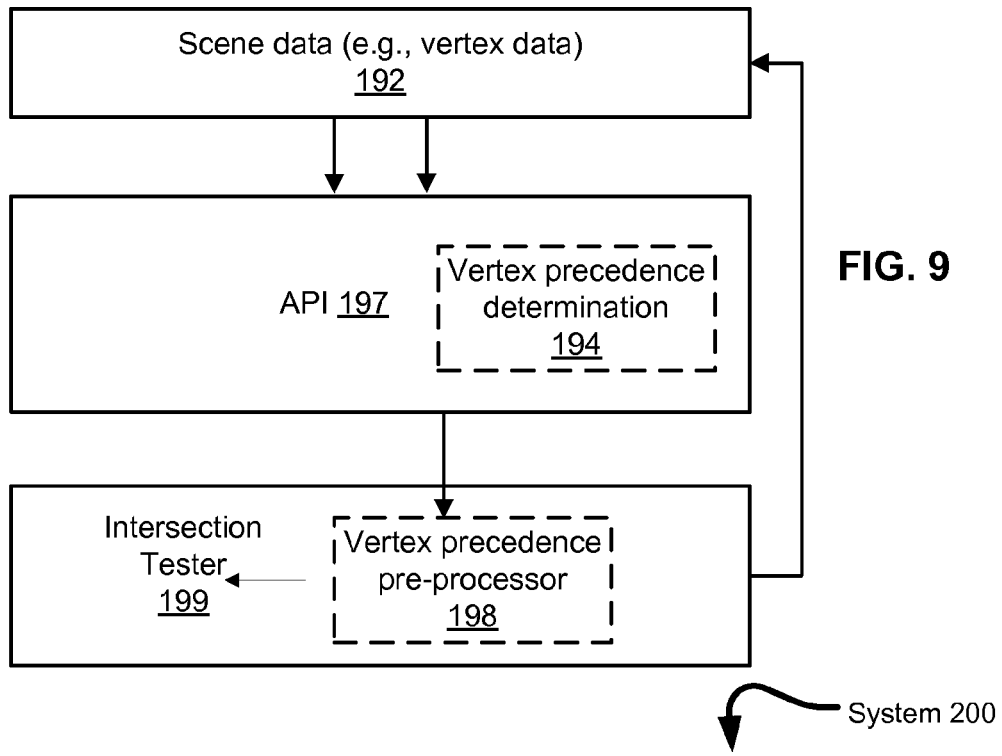
FIG. 9 depicts that a system in which aspects described herein can be practice.

FIG. 9 depicts a source 192 of data defining a scene (e.g., vertex and edge data), that can be provided through an API 197. API 197 can perform vertex precedence determination as described herein (precedence determiner 194). An output of precedence determiner can provide input than can be used by an intersection tester 199. Such input typically would be provided indirectly, as precedence determiner 194 would generally operate on batches of scene data, as explained above. Alternatively, intersection tester 199 can have a preprocessor 198 to perform such precedence determination. In some aspects, determiner 194 can append a bit associated with an edge (e.g., with a vertex that is a portion of a definition of such an edge). The appended bit can be used by preprocessor 198 to determine edge directionality or precedence of one vertex over another one defining that edge, for use during intersection testing. Alternatively, by example, preprocessor 198 can implement a vertex scene-space sort approach, as described with respect to FIGS. 4-6.

Figure 10:
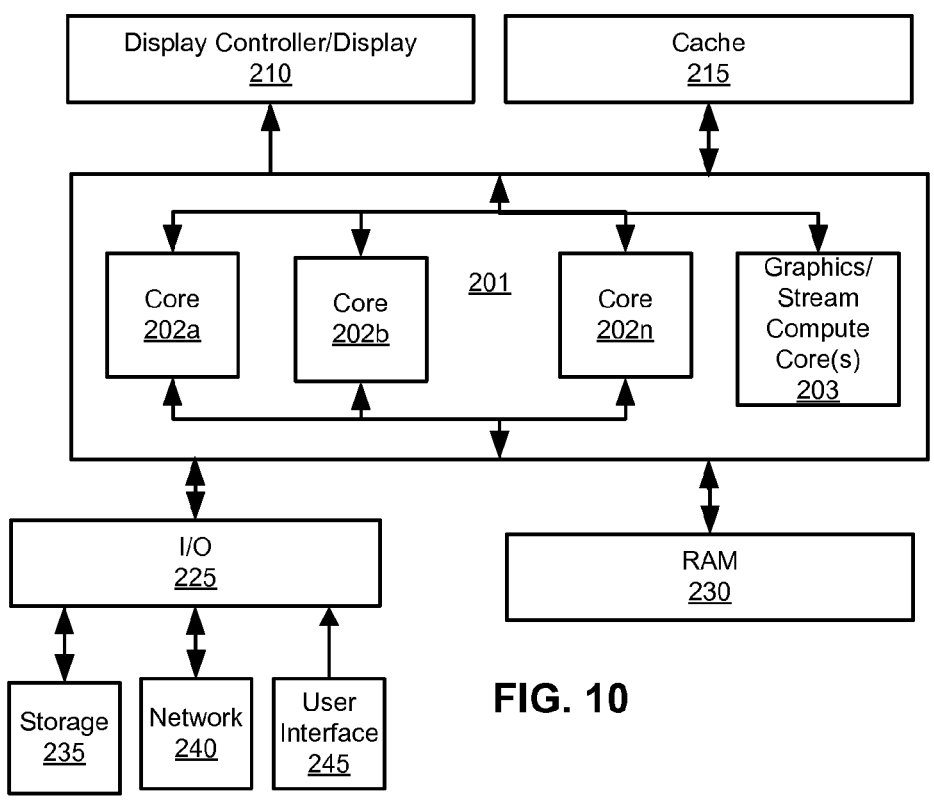
FIG. 10 depicts an example system construction which can be used in practicing aspects disclosed herein.

FIG. 10 depicts an example system 200 in which disclosed aspects can be implemented. System 200 comprises a computing resource 201 comprising a plurality of cores 202a-202n, with each core being used to identify a plurality of logically and/or physically separate sub-units of computing resource 201, which each can be used to execute operations that can be hard-coded and/or configured using code from computer readable media. For example, each core 202a-202n may be operable to concurrently execute multiple computing threads. Computing resource 201 is operable to communicate with a cache 215, which represents one or more fast access memory components, and which can be assigned to respective core(s) from cores 202a-202n, shared, or some combination of assignment and sharing. Each of cores 202a-202n can have their own caches, which can be private or shared with one or more other cores. The cores 202a-202n also can be provided with a graphics or stream compute core or cores (203).

An I/O interface 225 provides access to non-volatile storage 235, examples of which include one or more hard disk drives, a flash drive, DVD, or high-definition storage media. Interface 225 also provides one or more network interfaces 240, which can comprise, for example, Ethernet and 802.11 wireless networking capability, Bluetooth, and so on. Interface 225 also provides access to a user interface 245, which can comprise a mouse, keyboard, microphone, touch screen input, and so on. System 200 also comprises a RAM 230, which communicates with computing resource 201, and can be used for storing code and data used more frequently than code and data stored in storage 235. System 200 also comprises one or more of a display controller and display, collectively identified as 210. In some cases, one or more of cores 202a-202n or stream compute 203 can be physically located on a graphics card having other display controller logic, and conversely, display controller 210 functionality can be co-located with computing resource 201.

In some cases, it may be preferable to store rays currently being tested for intersection in cache 215, while fetching primitives for testing from RAM 230 when required. Shaders can be stored in RAM 230, along with texture data. Each core 202a-202n may be assigned to perform intersection testing or shading, or in some cases, may perform a combination of intersection and shading operations.

API 197 can be stored in storage 235, and loaded into RAM 230 (or a combination of RAM 230 and cache 215) with a rendering application, such as a video game, a computer aided design or animation package, and so on. API 197 also can access code and/or hardware appropriate to the particular system implementation, to implement the calls described above.

As disclosed herein, an example approach to testing edges in a consistent orientation can be implemented by including one or more bits that establish a precedence among the vertices defined by vertex data within a given data structure or stream of vertices. Another example approach is to give relative precedence to a vertex (of a given vertex pair) based on a min/max value in any one or more of the three dimensions of the space (e.g., assigning precedence to a vertex that has the lowest (highest) value in a given direction or along a given axis).

In sum, any of the functions, features, and other logic described herein can be implemented with a variety of computing resources. A computing resource can be a thread, a core, a processor, a fixed function processing element, and the like. Also, other functions, which are not primarily the focus of this description, can be provided or implemented as a process, thread or task that can be localized to one computing resource or distributed among a plurality of computing resources (e.g., a plurality of threads distributed among a plurality of physical compute resources).

Likewise, computing resources being used for intersection test can also host other processes, such as shading processes that are used to shade intersections detected. By further example, if a core can support multiple threads, then a thread can be dedicated to shading while another thread can be dedicated to intersection processing.

Code for any method can be stored in computer readable media, such as solid-state drives, hard drives, CD-ROMs and other optical storage means, and transiently in volatile memories, such as DRAM. Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Some aspects of the API described herein can be implemented as procedures, functions, or calls to such procedures and functions. This description implies no limitation as to a programming methodology that can be used to implement or provide the functionality described as being available through these procedures or functions, so long as software, hardware or a mixture thereof provides a programmer with an ability to access such functionality through an interface provided therefore. Various names were provided for particular coding concepts. These names imply no requirement as to what code performing these functions need to called in an implementation, and imply no restriction on how these concepts are implemented.

The various examples described above are provided by way of illustration only and should not be construed as limiting. For example, only a limited example of ray tracing behavior was presented, and it would be understood that practical implementations involve many more rays, and often more concurrent processing thereof. The disclosures herein can be adapted and understood from that perspective. In addition, separate boxes or illustrated separation of functional elements of illustrated systems implies no required physical separation of such functions, as communications between such elements can occur by way of messaging, function calls, shared memory space, and so on, without any such physical separation. More generally, a person of ordinary skill would be able to adapt the disclosures relating to the programming semantic to a variety of other ray tracing/ray shading implementations, and no implied limitation as to its application exists from the systems, methods, and other disclosure used to explain examples thereof.

We claim:

1. An apparatus, comprising:
   an intersection testing unit configured for testing rays for intersection with primitives of a 3-D scene being ray traced, wherein the primitives are defined by edges defined by respective selections of pairs of vertexes from vertex data, and the edges can be shared among definitions of multiple primitives; and
   an input pre-processor coupled with the intersection testing unit operable to receive vertexes to be submitted to the intersection testing unit, and to determine an order in which the vertexes are to be submitted to the intersection testing unit, the order determined by enforcing a canonical pre-determined relative order among all vertex positions in the 3-D scene, the enforcing comprising reordering a presentation order of vertexes to the intersection testing unit in response to determining that an order in which those vertexes were received by the input pre-processor violates the pre-determined relative order of the positions of those vertexes.

2. The apparatus of claim 1, wherein the input pre-processor is operable to determine the relative positions of the vertexes in scene space by sorting the vertexes using respective values of one or more coordinate axes of the scene space.

3. The apparatus of claim 1, wherein the input pre-processor is configured to orient an edge defined by a pair of received vertexes based on which vertex of that pair has a smallest or a largest value in a selected axis of the scene space.

4. The apparatus of claim 1, wherein the input pre-processor is configured to orient an edge defined by a pair of received vertexes based on determining a min/max value in any one or more of scene dimensions of the space for those vertexes.

5. The apparatus of claim 3, wherein the input pre-processor is configured to sequentially select each axis of a 3-D scene space according to a determined order, and the vertexes sorted for that axis until a smallest or a largest value is determined.

6. The apparatus of claim 1, wherein the input pre-processor is operable to receive the vertexes during a setup phase, to determine a relative ordering of the vertexes defining the edge, and associate a flag with the edge, wherein the intersection testing unit is operable to interpret the flag and responsively reorder the vertexes, if indicated by the flag.

7. The apparatus of claim 1, wherein the intersection testing unit is operable to perform one of a triple half plane test and an unsigned volume test.

8. A computer-implemented method for use in ray tracing, comprising:
   in a ray intersection testing component, testing a ray for intersection with a surface defined by a plurality of curves, wherein the curves are defined at least in part by pairs of vertexes submitted to the ray intersection testing component;
   in a pre-processor component,
      inputting a pair of vertexes that are to be submitted to the ray intersection testing component, the inputting of the pair of vertexes occurring a plurality of times during testing of multiple different primitives for intersection,
      determining a constant relative ordering of the vertexes in the pair, wherein the constant relative ordering is preserved for every time that the vertexes of the pair are to be submitted to the ray intersection testing component and conforms to a canonical pre-determined relative order among all vertex positions in the 3-D scene, and
      submitting vertexes of the pair to the ray intersection testing component in the determined constant relative ordering.

9. The method of claim 8, wherein the surface is a first primitive defined by a plurality of line segments, and at least one line segment of the plurality is shared with a second primitive.

10. The method of claim 9, wherein the first primitive and the second primitive are from different triangle strips.

* * * * *